United States Patent [19]

Iwaya et al.

[11] Patent Number: 5,504,148
[45] Date of Patent: Apr. 2, 1996

[54] ALIPHATIC POLYESTERS AND METHOD OF PREPARING THE SAME

[75] Inventors: Yoshiaki Iwaya, Yasu; Katsuyuki Mukai; Masatoshi Kawanishi, both of Uji; Minoru Nishinohara, Joyo, all of Japan

[73] Assignee: Unitika Ltd., Hyogo, Japan

[21] Appl. No.: 341,570

[22] PCT Filed: Mar. 18, 1994

[86] PCT No.: PCT/JP94/00447

§ 371 Date: Nov. 22, 1994

§ 102(e) Date: Nov. 22, 1994

[87] PCT Pub. No.: WO94/21708

PCT Pub. Date: Sep. 29, 1994

[30] Foreign Application Priority Data

| Mar. 22, 1993 | [JP] | Japan | 5-088103 |
| Mar. 31, 1993 | [JP] | Japan | 5-098851 |
| May 27, 1993 | [JP] | Japan | 5-151390 |
| Nov. 1, 1993 | [JP] | Japan | 5-297330 |
| Nov. 1, 1993 | [JP] | Japan | 5-297331 |

[51] Int. Cl.$^6$ .................................................. C08K 3/10
[52] U.S. Cl. ..................... 524/783; 528/272; 528/279; 528/283; 528/285; 528/300; 528/301; 528/302; 524/706; 524/780
[58] Field of Search ....................... 528/272, 279, 528/283, 285, 302, 300, 301; 524/706, 780, 783

[56] References Cited

U.S. PATENT DOCUMENTS

| 4,101,526 | 7/1978 | Buxbaum | 528/179 |
| 5,237,042 | 8/1993 | Kim et al. | 528/279 |
| 5,296,587 | 3/1994 | Summer, Jr. et al. | 528/281 |
| 5,310,782 | 5/1994 | Takiyama et al. | 524/706 |
| 5,374,259 | 12/1994 | Takahashi et al. | 604/367 |

FOREIGN PATENT DOCUMENTS

| 50-47492 | 4/1975 | Japan. |
| 52-078997 | 7/1977 | Japan. |
| 58-141208 | 8/1983 | Japan. |
| 1444817 | 8/1976 | United Kingdom. |
| 1533650 | 11/1978 | United Kingdom. |

*Primary Examiner*—Samuel A. Acquah
*Attorney, Agent, or Firm*—Wenderoth, Lind & Ponack

[57] ABSTRACT

The present invention provides a high molecular weight aliphatic polyester which is biodegradable by microorganisms in soils and which is utilized as a molded article as well as a method to prepare the same. This polyester has a structure shown below:

$$+O{-}(CH_2)_2{-}O{-}\overset{O}{\underset{\|}{C}}{-}(CH_2)_2{-}\overset{O}{\underset{\|}{C}}+ \qquad (1)$$

as well as those analogous thereto.

14 Claims, No Drawings

ALIPHATIC POLYESTERS AND METHOD OF PREPARING THE SAME

This application is a 371 of PCT/JP94/00447 filed Mar. 18, 1994.

FIELD OF THE INVENTION

The present invention relates to a high molecular weight aliphatic polyester which can be biodegraded by microorganisms in soils and which can be utilized as a molded article and to a method of preparing the same.

BACKGROUND OF THE INVENTION

Synthetic fibers, films and other molded articles utilize plastic materials which are light in weight, tough, and are capable of being mass-produced stably at a low cost, whereby having been providing a convenient satisfactory life which is so-called a plastic civilization. However, recent concerning on global environment raises a demand for the polymeric materials which can be degraded in environment. Among such materials, plastic materials capable of being degraded by microorganisms are especially attractive and expected to be used as environment-conscious materials as well as novel functional materials.

It is well known that aliphatic polyesters are biodegradable. Representatives of such polyesters are poly-3-hydroxybutyric acid (PHB) which is produced by micro-organisms and poly-ε-caprolactone (PCL) and polyglycolic acid (PGA) which are synthetic polymers.

Although the polyesters mainly consisting of PHB have excellent compatibility with the environment as well as physical properties and are produced in an industrial scale, their producibility is poor and they are of only limited use in view of the cost when used as the substitutes of widely-employed plastics such as polyethylene (See "Fibers and industry", Vol. 47, page 532 (1991)). On the other hand, PCL provides highly polymerized materials capable of being formed into fibers or films, but has poor heat resistance due to its melting point as low as 65° C. or lower, resulting in impossibility of being applied widely (See "Polym. Sci. Technol.", Vol. 3, page 61 (1973)). PGA and glycolide-lactide (9:1) copolymer which are used practically in biocompatible sutures are non-biologically hydrolyzed and then metabolized and absorbed in vivo, but are expensive and have poor water resistance, thus being not suitable to be employed widely.

Aliphatic polyesters obtained by melt condensation polymerization of α, ω-aliphatic diols and α, ω-aliphatic dicarboxylic acids, such as polyethylene succinate (PES), polyethylene adipate (PEA) and polybutylene succinate (PBS), are well known, which can be produced at a low cost and are proven in in-soil tests to be capable of being biodegraded by microorganisms (See "Int. Biodetetn. Bull.", Vol. 11, page 127 (1975) and "Polym. Sci. Technol.", Vol. 3, page 61 (1973)). However, these polymers have poor thermal stability, and undergo concomitant degradation reaction upon the condensation polymerization. Accordingly, they usually have a molecular weights as low as 2,000 to 6,000 (reduced specific viscosity ηsp/c at 0.5 g/dl in chloroform determined at 30° C. is 0.3 or lower), which are not suitable to be used in fibers or films. Among them, polyethylene succinate and polybutylene succinate have the melting points of 100° C. or higher and are reported to have excellent biodegradability, but because of their poor thermal stabilities during polymerization the materials having molecular weights sufficient to be molded can not be obtained by ordinary methods. For example, in the reference cited above (Int. Biodetetn. Bull., Vo. 11, page 127 (1975)), a commercial low molecular polyethylene succinate is heated under reduced pressure to obtain a material capable of film-forming, but the molecular weight obtained is in the order of about 20,000, which failed to provide satisfactory functions. A polyethylene succinate having molecular weight of 39,600 obtained by condensation polymerization of succinic acid and ethylene glycol via stepwise removal of low molecular materials using methanol (See Die Makromolekulare Chemie, Vol 140, page 65 (1970)) has no sufficient strength in view of moldability, and is obtainable only by such complicated procedure, which gives very low yield of high molecular polyesters.

In another attempt, a polyethylene succinate and a polybutylene succinate having the molecular weights of 10,000 or higher are synthesized using titanium oxyacetyl acetonate or alkoxytitanium compound as the catalysts by a direct condensation polymerization method, but the molecular weights are not more than about 15,000, which could not provide moldable aliphatic polyesters (See JPA H5-70572, JPA H5-70566 and JPA H5-70574). In addition, this method suffered from the problem of polymer staining unless the catalysts are used only in minimum amounts.

Accordingly, it is attempted to increase the molecular weight of such aliphatic polyesters by the treatment with diisocyanates such as hexamethylene diisocyanate and tolylene diisocyanate (See "Polym. J.", Vol. 2, page 387 (1971) and JPA H4-189822). However, this method involves the complicated 2-step reaction process, slight reduction in crystallinity and melting point as well as formation of urethane bonds in the molecules which gives somewhat reduced biodegradability, although it gives the increased molecular weights.

Thus, the present invention provides the high molecular weight aliphatic polyesters based on polybutylene succinate and polyethylene succinate and the method of preparing the same, which eliminates the problems associated with the conventional methods, prevents staining and do not affect naturally-associated biodegradability, and gives the molecular weights sufficient to be utilized for molded articles.

DETAILED DESCRIPTION OF THE INVENTION

It has surprisingly been found that the problems mentioned above can be solved by providing aliphatic polyesters which are prepared using particular catalysts.

Thus, the present invention provides an aliphatic polyester having the structural unit shown below:

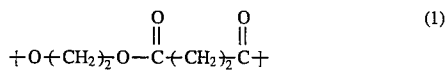
(1)

and a number average molecular weight of at least 50,000.

The present invention also provides an aliphatic polyester having the structural unit shown below:

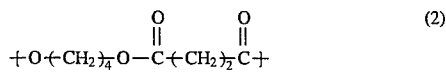
(2)

and a number average molecular weight of at least 30,000.

The present invention further provides an aliphatic polyester having the structural units shown below:

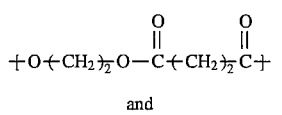

(1)

and

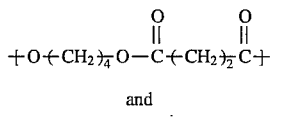

(2)

and a number average molecular weight of at least 30,000.

The present invention further provides an aliphatic polyester having the structural units shown below:

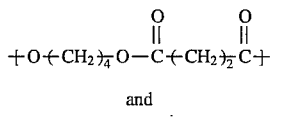

(2)

and

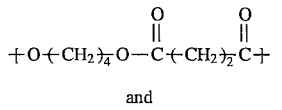

(3)

and a number average molecular weight of at least 30,000.

The present invention further provides an aliphatic polyester having the structural units shown below:

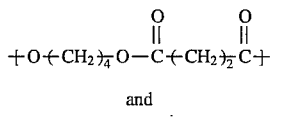

(2)

and

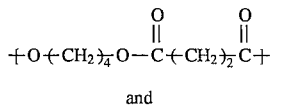

(4)

and a number average molecular weight of at least 30,000.

The present invention further provides an aliphatic polyester having the structural units shown below:

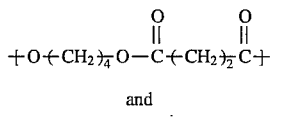

(2)

and

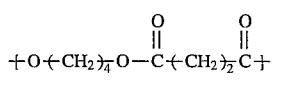

(5)

and a number average molecular weight of at least 30,000.

The present invention further provides an aliphatic polyester having the structural units shown below:

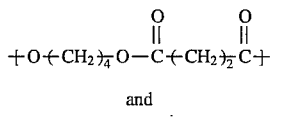

(2)

and

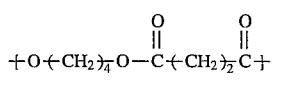

(6)

and a number average molecular weight of at least 30,000.

The present invention is described in detail below.

The first aliphatic polyesters according to the present invention are the polyethylene succinate consisting of the structural unit represented by formula (1), and have a number average molecular weight of at least 50,000, particularly from 50,000 to 75,000, when determined by gel permeation chromatography (GPC) and calibrated to that of polystyrene. Such aliphatic polyesters can provide colorless white polymers. A number average molecular weight less than 50,000 affects moldability and processability and strength of the molded articles.

The second aliphatic polyesters according to the present invention are the polybutylene succinate consisting of the structural unit represented by formula (2), and have a number average molecular weight of at least 30,000, particularly from 30,000 to 75,000, when determined by GPC and calibrated to that of polystyrene. A number average molecular weight less than 30,000 affects moldability and processability and strength of the molded articles.

The third aliphatic polyesters according to the present invention are the polybutylene succinate consisting of the structural unit represented by formula (2) in combination with the structural units represented by formulae (1), (3), (4), (5) and (6), and have a number average molecular weight of at least 30,000, and particularly from 30,000 to 75,000, when determined by GPC and calibrated to that of polystyrene. A number average molecular weight less than 30,000 affects moldability and processability and the strength of the molded articles. In such aliphatic polyesters, the molar ratio of the unit represented by formula (2) to each of the units represented by formulae (1), (3), (4), (5) and (6) is preferably 1:0.01 to 1:0.3. With a molar ratio exceeding 1:0.3, a high melting point is no more maintained and the crystallinity of the polymer is reduced.

An aliphatic polyester consisting of the structural unit represented by formula (1) can be obtained by reacting succinic acid with ethylene glycol to yield oligomers which are then subjected to condensation polymerization in the presence of a catalyst and a phosphorus compound. The molar ratio of succinic acid to ethylene glycol as the inputs for the oligomer formation by means of ester exchange is preferably 1:1 to 1:2.2, more preferably 1:1.05 to 1:1.6, and most preferably 1:1.05 to 1:1.5.

The ester exchange for the formation of the oligomer is conducted at 120° to 250° C. for 1 to 10 hours, more preferably at 150° to 220° C. for 2 to 5 hours under atmospheric pressure and nitrogen flow.

In the present invention, one or more of dicarboxylic acids such as oxalic acid, adipic acid, sebacic acid, pimelic acid, suberic acid, azelaic acid, dodecanedioic acid and acid anhydrides thereof and diols such as propylene glycol, trimethylene glycol, 1,4-butanediol, hexamethylene glycol, 1,4-cyclohexane dimethanol, neopentyl glycol, diethylene glycol and the like may concomitantly be used provided that the physical properties of the aliphatic polyester obtained is not affected.

In the present invention, the oligomer obtained as above is then subjected to condensation polymerization in the presence of at least one catalyst selected from the group of titanium, germanium and antimony-based catalysts as well as a phosphorus compound.

The polymerization catalyst employed in the deglycol reaction and the polymerization may be titanium, germanium and antimony-based catalysts, which are used in the forms of metal alkoxides, metal oxides, metal complexes, metal hydroxides, carbonates, sulfates, nitrates and chlorides. Examples of particularly preferred catalysts are tetra-n-butyl titanate, tetraisopropyl titanate, titanium oxyacetylacetonate, tetra-n-butoxy germanium, germanium oxide (IV), tributoxy antimony, antimony trioxide, antimony acetate and the like, which are used independently or in combination. The amount of the catalyst employed in such polymerization is preferably 0.02 to 1 part by weight, and more preferably 0.05 to 0.5 parts by weight per 100 parts by weight of the aliphatic polyester produced. The amount of the catalyst less than 0.02 parts by weight gives insufficient effect as a catalyst and difficulty in obtaining a polymer having a desirable molecular weight, while the amount exceeding 1 part by weight gives no increased effect but gives an undesirably stained polymer. Such catalyst may be present upon the condensation polymerization, or may be added immediately before the deglycol reaction, or before esterification.

The phosphorus compound which is added together with the catalyst upon the condensation polymerization by the deglycol reaction may be phosphoric acid, phosphoric anhydride, polyphosphoric acid, metaphosphoric acid, pyrophosphoric acid, phosphorous acid, hypophosphorous acid, tripolyphosphoric acid and salts thereof with metals and ammonium, as well as chloride, bromide, sulfide and ester thereof, and preferably phosphoric acid, polyphosphoric acid and metaphosphoric acid. These phosphorus compounds may be employed independently or in combination. The amount of the phosphorus compound employed is preferably 0.001 to 1 part by weight, more preferably 0.01 to 0.5 parts by weight, based on 100 parts by weight of the aliphatic polyester formed. The amount less than 0.001 part by weight causes reduced effect of the phosphorus compound as an anti-coloring agent, while that of 1 part by weight or more results in prolonged period required for polymerization. Such phosphorus compound may be present upon the condensation polymerization, or may be added immediately before the deglycol reaction, or before esterification.

The condensation polymerization may preferably be conducted under a reduced pressure from 0.01 to 10 mmHg at 200° to 280° C. for 1 to 10 hours, more preferably under a reduced pressure from 0.1 to 1 mmHg at 220° to 260° C. for 1 to 5 hours.

As described above, a colorless white polymer consisting of the structural unit represented by formula (1) and having a number average molecular weight of 50,000 and higher can be obtained. The polymer having a number average molecular weight of 50,000 or higher has sufficient moldability and processability as well as strength. Such high molecular weight aliphatic polyester can not be obtained by any of the conventional methods, but can be by our method for the first time.

An aliphatic polyester consisting of the structural unit represented by formula (2) can be obtained by reacting succinic acid with 1,4-butanediol to yield oligomers which are then subjected to the condensation polymerization in the presence of a catalyst. The molar ratio of succinic acid to 1,4-butanediol as the inputs for the oligomer formation by means of ester exchange is preferably 1:1 to 1:2.2, more preferably 1:1.05 to 1:1.6, and most preferably 1:1.05 to 1:1.5.

The ester exchange for the formation of the oligomer is conducted at 120° to 250° C. for 1 to 10 hours, more preferably at 150° to 220° C. for 2 to 5 hours under atmospheric pressure and nitrogen flow.

In the present invention, one or more of dicarboxylic acids such as oxalic acid, pimelic acid, suberic acid, azelaic acid, dodecanedioic acid and acid anhydrides thereof and diols such as trimethylene glycol, hexamethylene glycol, 1,4-cyclohexane dimethanol, neopentyl glycol and the like may concomitantly be used provided that the physical properties of the aliphatic polyester obtained is not affected.

In the present invention, the oligomer formation by the ester exchange may be conducted in the presence of a group IIA element metal compound as the catalyst. Such group IIA element metal catalyst may be beryllium, magnesium, calcium, strontium, barium and radium and the like, which are used in the forms of organic metal compounds, organic acid salts, metal complexes, metal alkoxides, metal oxides, metal hydroxides, carbonates, phosphate, sulfates, nitrates and chlorides, with acetate, acetylacetonate and metal oxide being preferred. The amount of the catalyst employed in the polymerization is preferably 0.02 to 1 part by weight, per 100 parts by weight of the aliphatic polyester produced.

In the present invention, the oligomer obtained as above is then subjected to the condensation polymerization in the presence of the polymerization catalyst. The polymerization catalyst employed in the deglycol reaction and the polymerization may be group IVA element catalysts or antimony based catalysts, which are used in the forms of metal alkoxides, metal oxides, metal complexes, metal hydroxides, carbonates, sulfates, nitrates and chlorides. Examples of group IVA elements are titanium, zirconium, hafnium and the like. Examples of particularly preferred catalysts are tetra-n-butyl titanate, tetraisopropyl titanate, titanium oxyacetylacetonate, tributoxy antimony, triethoxy antimony, antimony acetate and the like, which are used independently or in combination. The amount of the catalyst employed is preferably 0.02 to 1 part by weight, more preferably 0.05 to 0.5 parts by weight per 100 parts by weight of the aliphatic polyester formed. The amount of the catalyst less than 0.02 parts by weight gives insufficient effect as a catalyst and difficulty in obtaining a polymer having a desirable molecular weight, while the amount exceeding 1 part by weight gives no increased effect but gives an undesirably stained polymer. Such catalyst may be present upon the condensation polymerization, or may be added immediately before the deglycol reaction, or before esterification.

Upon the polymerization by the deglycol reaction, a phosphorus compound may be added as an anti-coloring agent together with the catalyst. Such phosphorus compound may be phosphoric acid, phosphoric anhydride, polyphosphoric acid, metaphosphoric acid, pyrophosphoric acid, phosphorous acid, hypophosphorous acid, tripolyphosphoric acid and salts thereof with metals and ammonium, as well as chlorides, bromides, sulfides and esters thereof, and preferably phosphoric acid, polyphosphoric acid and metaphosphoric acid. These phosphorus compounds may be employed independently, or in combination. The amount of the phosphorus compound employed is preferably 0.001 to 1 part by weight, more preferably 0.01 to 0.5 parts by weight, based on 100 parts by weight of the aliphatic polyester formed. The amount less than 0.001 part by weight causes reduced effect of the phosphorus compound as a anti-coloring agent, while that of 1 part by weight or more results in prolonged period required for polymerization. Such phosphorus compound may be present upon the condensation polymerization, or may be added immediately before the deglycol reaction, or before esterification.

The condensation polymerization may preferably be conducted under a reduced pressure from 0.01 to 10 mmHg at 200° to 280° C. for 1 to 10 hours, more preferably under a reduced pressure from 0.1 to 1 mmHg at 220° to 260° C. for 1 to 5 hours.

As described above, a colorless white polymer consisting of the structural unit represented by formula (2) and having a number average molecular weight of 30,000 and higher can be obtained. The polymer having a number average molecular weight of 30,000 or higher has sufficient moldability and processability as well as strength. Such high molecular weight aliphatic polyester can not be obtained by any of the conventional methods, but can be by our method for the first time.

The aliphatic polyester consisting of the structural unit represented by formula (2) and any of the structural units represented by formula (1), (3), (4), (5) and (6) may be obtained by the method quite similar to that for the aliphatic polyester consisting of the structural unit represented by formula (2) as described above. Any of such aliphatic polyesters can be obtained by reacting a di-carboxylic acid with a diol to yield oligomers which are then subjected to the condensation polymerization in the presence of a catalyst. The molar ratio of the dicarboxylic acid to the diol as the inputs for the oligomer formation by means of ester exchange is preferably 1:1 to 1:2.2, more preferably 1:1.05 to 1:1.6, and most preferably 1:1.05 to 1:1.5. The molar ratio of succinic acid to adipic acid or sebacic acid as the inputs is preferably 1:0.01 to 1:0.3. The molar ratio of 1,4-butanediol to ethylene glycol, propylene glycol or diethylene glycol as the inputs is 1:0.01 to 1:0.3.

The ester exchange for the formation of the oligomer is conducted at 120° to 250° C. for 1 to 10 hours, more preferably at 150° to 220° C. for 2 to 5 hours under atmospheric pressure and nitrogen flow.

In the present invention, one or more of dicarboxylic acids such as oxalic acid, adipic acid, sebacic acid, pimelic acid, suberic acid, azelaic acid, dodecanedioic acid and acid anhydrides thereof and diols such as ethylene glycol, propylene glycol, trimethylene glycol, hexamethylene glycol, 1,4-cyclohexane dimethanol, neopentyl glycol and the like may concomitantly be used provided that the physical properties of the aliphatic polyester obtained is not affected.

In the present invention, the oligomer formation by the ester exchange may be conducted in the presence of a group IIA element metal compound as the catalyst. The group IIA element metal catalyst may be beryllium, magnesium, calcium, strontium, barium and radium and the like, which are used in the forms of organic metal compounds, organic acid salts, metal complexes, metal alkoxides, metal oxides, metal hydroxides, carbonates, phosphate, sulfates, nitrates and chlorides, with acetate, acetylacetonate and metal oxide being preferred. The amount of the catalyst employed in the polymerization is preferably 0.02 to 1 part by weight per 100 parts by weight of the aliphatic polyester produced.

In the present invention, the oligomer obtained as above is then subjected to the condensation polymerization in the presence of the polymerization catalyst. The polymerization catalyst employed in the deglycol reaction and the polymerization may be group IVA element catalysts or antimony based catalysts, which are used in the forms of metal alkoxides, metal oxides, metal complexes, metal hydroxides, carbonates, sulfates, nitrates and chlorides. Examples of group IVA elements are titanium, zirconium, hafnium and the like. Examples of particularly preferred catalysts are tetra-n-butyl titanate, tetraisopropyl titanate, titanium oxyacetylacetonate, tributoxy antimony, triethoxy antimony, antimony acetate and the like, which are used independently or in combination. The amount of the catalyst employed is preferably 0.02 to 1 part by weight, more preferably 0.05 to 0.5 parts by weight per 100 parts by weight of the aliphatic polyester formed. The amount of the catalyst less than 0.02 parts by weight gives insufficient effect as a catalyst and difficulty in obtaining a polymer having a desirable molecular weight, while the amount exceeding 1 part by weight gives no increased effect but gives an undesirably stained polymer. Such catalyst may be present upon the condensation polymerization, or may be added immediately before the deglycol reaction, or before esterification.

Upon the polymerization by the deglycol reaction, a phosphorus compound may be added as an anti-coloring agent together with the catalyst. The phosphorus compound may be phosphoric acid, phosphoric anhydride, polyphosphoric acid, metaphosphoric acid, pyrophosphoric acid, phosphorous acid, hypophosphorous acid, tripolyphosphoric acid and salts thereof with metals and ammonium, as well as chlorides, bromides, sulfides and esters thereof, and preferably phosphoric acid, polyphosphoric acid and metaphosphoric acid. These phosphorus compounds may be employed independently, or in combination. The amount of the phosphorus compound employed is preferably 0.001 to 1 part by weight, more preferably 0.01 to 0.5 pads by weight, based on 100 parts by weight of the aliphatic polyester formed. The amount less than 0.001 part by weight causes reduced effect of the phosphorus compound as an anticoloring agent, while that of 1 part by weight or more results in prolonged period required for polymerization. The phosphorus compound may be present upon the condensation polymerization, or may be added immediately before the deglycol reaction, or before esterification.

The condensation polymerization may preferably be conducted under a reduced pressure from 0.01 to 10 mmHg at 200° to 280° C. for 1 to 10 hours, more preferably under a reduced pressure from 0.1 to 1 mmHg at 220° to 260° C. for 1 to 5 hours.

As described above, a colorless white polymer consisting of the structural unit represented by formula (2) and any of the structural units represented by the formulae (1), (3), (4), (5) and (6) and having a number average molecular weight of 30,000 and higher can be obtained. The polymer having a number average molecular weight of 30,000 or higher has sufficient moldability and processability as well as strength. Such high molecular weight aliphatic polyester can not be obtained by any of the conventional methods, but can be by our method for the first time.

Since the aliphatic polyester obtained as described above has no color, is thermoplastic, and has moldability and processability, it can be used in wide applications. For example, it can be used as a biodegradable polymer in films, fibers and sheets, from which various bottles, shopping bags, packaging materials, synthetic threads, leisure fishing threads, fishing nets, unwoven fabrics, agricultural multi-purpose films and the like.

The aliphatic polyester according to the present invention, when used as a biodegradable polymer, can be proved to have a biodegradability easily by ordinary in-soil tests, or by immersing it in an activated waste soil exposure tank employed in a waste water treatment facility, although it has no clear selectivity for the microorganisms. Thus, an article made from the present polyester is placed in a soil for a predetermined period, and then the molecular weight of the polyester is determined or the surface morphology is compared with that before being placed in a soil, whereby confirming the biodegradability.

EXAMPLES

The present invention is further described in the following examples, in which parameters were determined as described below.
(1) Number average molecular weight (Mn) as polystyrene from data of GPC Using GPC device manufactured by Waters, a column having the diameter of 7.8 mmϕ and the length of 30 cm in which 2 waters ultrastyragel having the average pore sizes of $10^3$ and $10^4$ Å were attached, and chloroform as an eluent, determination was conducted at 35° C.

As a standard, polystyrene was employed.
(2) Reduced specific viscosity (ηsp/c)

Uberode viscosity meter was used to determine the viscosity of the polymer solution at 0.5 g/dl, which was used as an index of the molecular weight.

Chloroform was used as a solvent at 30° C.

(3) Melting point

A melting point was determined using a thermal analysis instrument (DSC-7) manufactured by Perkin Elmer at the temperature elevation rate of 20° C./min.

(4) Appearance

Appearance was evaluated by macroscopic observation or by using an optical microscope.

A:Severely damaged, B:Significantly damaged, C:Slightly damaged, D:No change (5) Film strength According to JIS K-7327, a sample made in a certain size was determined for the film strength using the precise testing instrument Model 2020 manufactured by Intesco.

Example 1

To a three-necked flask fitted with a stirrer, Vigreaux fractionation condenser and a gas introduction tube, 47.2 g (0.4 mole) of succinic acid and 32.3 g (0.52 mole) of ethylene glycol were added, and the flask was immersed in an oil bath. The oil bath was heated to 200° C., and nitrogen was introduced slowly to the melting fluid. After 3 hours at 200° C., water formed and excessive ethylene glycol were distilled off to obtain an oligomer.

Then, 0.1 g of polyphosphoric acid and 0.15 g ($4.0 \times 10^{-4}$ mole) of tetra-n-butoxygermanium were added and the mixture was heated while maintaining the temperature at 220° C. under the reduced pressure of 0.5 mmHg for 2 hours, and subsequently at 240° C. under reduced pressure of 0.5 mmHg for 1 hour, to yield a viscose polymer.

ηsp/c value of this polymer was 1.09 (at 0.5 g/dl and 30° C. in chloroform), and the melting point was 104° C. A number average molecular weight (Mn) as polystyrene based on GPC data was 53,000.

Example 2

To a three-necked flask fitted with a stirrer, Vigreaux fractionation condenser and a gas introduction tube, 47.2 g (0.4 mole) of succinic acid and 46.9 g (0.52 mole) of 1,4-butanediol were added together with 0.026 g ($1.2 \times 10^{-4}$ mole) of magnesium acetate tetrahydrate, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.14 g ($4.0 \times 10^{-4}$ mole) of tetra-n-butyl titanate was added and the mixture was heated while raising the temperature to 220° C. under the reduced pressure of 2 mmHg under nitrogen for 2 hours, and subsequently at 240° C. under reduced pressure of 1 mmHg or lower for 1 hour, to yield a viscose polymer.

ηsp/c value of this polymer was 1.18 (at 0.5 g/dl and 30° C. in chloroform), and the melting point was 115° C. A number average molecular weight (Mn) as polystyrene based on GPC data was 57,000.

Example 3

To a three-necked flask fitted with a stirrer, Vigreaux fractionation condenser and a gas introduction tube, 47.2 g (0.4 mole) of succinic acid, 42.2 g (0.47 mole) of 1,4-butanediol and 3.2 g (0.05 mole) of ethylene glycol were added, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.27 g ($8.0 \times 10^{-4}$ mole) of tributoxy antimony was added and the mixture was heated while maintaining the temperature at 220° C. under the reduced pressure of 0.5 mmHg for 2 hours, and subsequently at 240° C. under reduced pressure of 0.5 mmHg for 1 hour, to yield a viscose polymer.

ηsp/c value of this polymer was 1.19 (at 0.5 g/dl and 30° C. in chloroform), and the melting point was 109° C. A number average molecular weight (Mn) as polystyrene based on GPC data was 58,000.

Example 4

To a three-necked flask fitted with a stirrer, Vigreaux fractionation condenser and a gas introduction tube, 118 g (1.0 mole) of succinic acid, 105 g (1.17 mole) of 1,4-butanediol and 9.13 g (0.13 mole) of propylene glycol were added together with 0.064 g ($3.0 \times 10^{-4}$ mole) of magnesium acetate tetrahydrate, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.34 g ($1.0 \times 10^{-3}$ mole) of tetra-n-butyl titanate was added and the mixture was heated while raising the temperature to 220° C. under the reduced pressure of 2 mmHg under nitrogen for 2 hours, and subsequently at 240° C. under reduced pressure of 1 mmHg or lower for 1 hour, to yield a viscose polymer.

ηsp/c value of this polymer was 1.00 (at 0.5 g/dl and 30° C. in chloroform), and the melting point was 112° C. A number average molecular weight (Mn) as polystyrene based on GPC data was 50,000.

Example 5

To a three-necked flask fitted with a stirrer, Vigreaux fractionation condenser and a gas introduction tube, 118 g (1.0 mole) of succinic acid, 105 g (1.17 mole) of 1,4-butanediol and 13.8 g (0.13 mole) of diethylene glycol were added together with 0.064 g ($3.0 \times 10^{-4}$ mole) of magnesium acetate tetrahydrate, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.34 g ($1.0 \times 10^{-3}$ mole) of tetra-n-butyl titanate was added and the mixture was heated while raising the temperature to 220° C. under the reduced pressure of 2 mmHg under nitrogen for 2 hours, and subsequently at 240° C. under reduced pressure of 1 mmHg or lower for 1 hour, to yield a viscose polymer.

ηsp/c value of this polymer was 1.05 (at 0.5 g/dl and 30° C. in chloroform), and the melting point was 110° C. A number average molecular weight (Mn) as polystyrene based on GPC data was 51,000.

Example 6

To a three-necked flask fitted with a stirrer, Vigreaux fractionation condenser and a gas introduction tube, 42.5 g (0.36 mole) of succinic acid, 5.85 g (0.04 mole) of adipic acid and 46.9 g (0.52 mole) of 1,4-butanediol were added together with 0.021 g ($1.2 \times 10^{-4}$ mole) of calcium acetate monohydrate, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.14 g ($4.0 \times 10^{-4}$ mole) of tetra-n-butyl titanate was added and the mixture was heated while raising the temperature to 220° C. under the reduced pressure of 2 mmHg under nitrogen for 2 hours, and subsequently at 240° C. under reduced pressure of 1 mmHg or lower for 1 hour, to yield a viscose polymer.

ηsp/c value of this polymer was 0.86 (at 0.5 g/dl and 30° C. in chloroform), and the melting point was 104° C. A number average molecular weight (Mn) as polystyrene based on GPC data was 46,000.

Example 7

To a three-necked flask fitted with a stirrer, Vigreaux fractionation condenser and a gas introduction tube, 100 g (0.85 mole) of succinic acid, 30.3 g (0.15 mole) of sebacic acid and 113 g (1.25 mole) of 1,4-butanediol were added together with 0.064 g ($3.0 \times 10^{-4}$ mole) of magnesium acetate tetrahydrate, and the flask was immersed in an oil bath. The oil bath was heated to 200° C., and nitrogen was introduced slowly to the melting fluid. After 3 hours at 200° C., water formed and excessive glycol were distilled off to obtain an oligomer.

Then, 0.34 g ($1.0 \times 10^{-3}$ mole) of tetra-n-butyl titanate was added and the mixture was heated while raising the temperature to 220° C. under the reduced pressure of 2 mmHg under nitrogen for 2 hours, and subsequently at 240° C. under reduced pressure of 1 mmHg or lower for 1 hour, to yield a viscose polymer.

ηsp/c value of this polymer was 0.95 (at 0.5 g/dl and 30° C. in chloroform), and the melting point was 103° C. A number average molecular weight (Mn) as polystyrene based on GPC data was 50,000.

Reference Examples 1 to 5

The polymers obtained in Examples 2, 4, 5, 6 and 7 were melted and pressurized at the temperatures higher by 30° to 40° C. than the respective melting points using a heat press instrument to obtain the films having the thickness of 50 μm. Then the films were cut into 5 cm×5 cm pieces, which were placed in a soil (5 to 10 cm below the surface in a garden of the house of an individual person). The appearance of the films was observed at an early stage and then after 3 and 6 months to evaluate for the biodegradability. The results are shown in Table 1.

In comparative examples, commercial polyethylene film and polyester film (both having the thickness of 50 μm) were subjected to the same experiments. The results indicated no change in appearance or film strength.

The aliphatic polyesters according to the present invention, which have the biodegradability, are not stained but have a high molecular weight and excellent moldability. Accordingly they can be used in biodegradable films, fibers and sheets. In addition, the methods of preparation according to the present invention can provide such high molecular aliphatic polyesters easily.

What is claimed is:

1. An aliphatic polyester having the structural unit shown below:

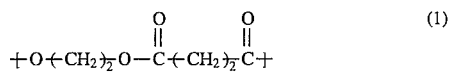 (1)

and a number average molecular weight of at least 50,000.

2. An aliphatic polyester having the structural unit shown below:

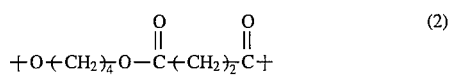 (2)

and a number average molecular weight of at least 30,000.

3. An aliphatic polyester having the structural units shown below:

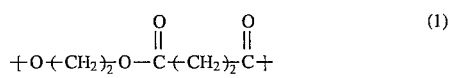 (1)

and

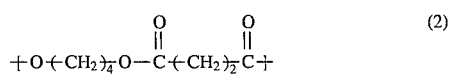 (2)

and a number average molecular weight of at least 30,000.

4. An aliphatic polyester having the structural units shown below:

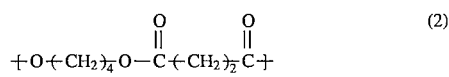 (2)

and

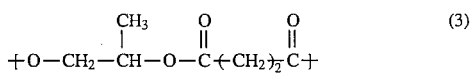 (3)

and a number average molecular weight of at least 30,000.

5. An aliphatic polyester having the structural units shown below:

TABLE 1

|  | Polymer | Appearance | | | Strength (kg/mm²) | | | ηsp/c(dl/g) | | |
| --- | --- | --- | --- | --- | --- | --- | --- | --- | --- | --- |
|  |  | 0 | after 3 months | after 6 months | 0 | after 3 months | after 6 months | 0 | after 3 months | after 6 months |
| Ref. 1 | Ex. 2 | D | C | C | 4.5 | 4.4 | 3.4 | 1.18 | 1.00 | 0.85 |
| Ref. 2 | Ex. 4 | D | C | C | 3.0 | 2.4 | 2.2 | 1.00 | 0.80 | 0.70 |
| Ref. 3 | Ex. 5 | D | C | C | 2.8 | 2.5 | 2.3 | 1.05 | 0.85 | 0.70 |
| Ref. 4 | Ex. 6 | D | C | B | 3.0 | 2.4 | 2.2 | 0.86 | 0.70 | 0.60 |
| Ref. 5 | Ex. 7 | D | C | B | 3.2 | 2.4 | 1.8 | 0.95 | 0.80 | 0.63 |

As evident from Table 1, the aliphatic polyesters of the present invention had the biodegradability.

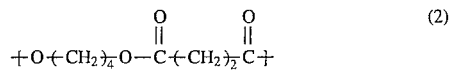 (2)

-continued and

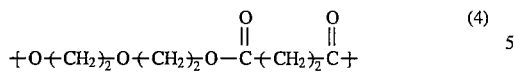 (4)

and a number average molecular weight of at least 30,000.

6. An aliphatic polyester having the structural units shown below:

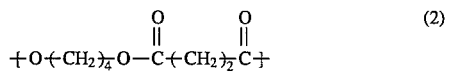 (2)

and

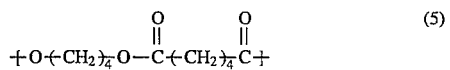 (5)

and a number average molecular weight of at least 30,000.

7. An aliphatic polyester having the structural units shown below:

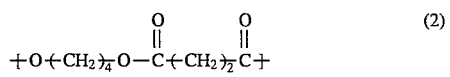 (2)

and

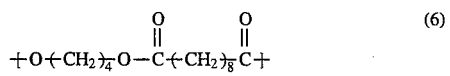 (6)

and a number average molecular weight of at least 30,000.

8. A method of preparing an aliphatic polyester according to claim 1 characterized in that succinic acid and ethylene glycol are reacted to obtain an oligomer, which is then subjected to condensation polymerization at a reduced pressure of 0.01 to 10 mmHg in the presence of one or more catalysts selected from the group consisting of titanium, germanium and antimony catalysts and also in the presence of a phosphorus compound.

9. A method of preparing an aliphatic polyester according to claim 2 characterized in that succinic acid and 1,4-butanediol are subjected to condensation polymerization at a reduced pressure of 0.01 to 10 mmHg in the presence of group IIA element catalysts and group IVA element catalysts or alkoxyantimony compounds or organic acid salts of antimony.

10. A method of preparing an aliphatic polyester according to claim 3 characterized in that succinic acid, 1,4-butanediol and ethylene glycol are subjected to condensation polymerization at a reduced pressure of 0.01 to 10 mmHg in the presence of group IIA element catalysts and group IVA element catalysts or alkoxyantimony compounds or organic acid salts of antimony.

11. A method of preparing an aliphatic polyester according to claim 4 characterized in that succinic acid, 1,4-butanediol and propylene glycol are subjected to condensation polymerization at a reduced pressure of 0.01 to 10 mmHg in the presence of group IIA element catalysts and group IVA element catalysts or alkoxyantimony compounds or organic acid salts of antimony.

12. A method of preparing an aliphatic polyester according to claim 5 characterized in that succinic acid, 1,4-butanediol and diethylene glycol are subjected to condensation polymerization at a reduced pressure of 0.01 to 10 mmHg in the presence of group IIA element catalysts and group IVA element catalysts or alkoxyantimony compounds or organic acid salts of antimony.

13. A method of preparing an aliphatic polyester according to claim 6 characterized in that succinic acid, adipic acid and 1,4-butanediol are subjected to condensation polymerization at a reduced pressure of 0.01 to 10 mmHg in the presence of group IIA element catalysts and group IVA element catalysts or alkoxyantimony compounds or organic acid salts of antimony.

14. A method of preparing an aliphatic polyester according to claim 7 characterized in that succinic acid, sebacic acid and 1,4-butanediol are subjected to condensation polymerization at a reduced pressure of 0.01 to 10 mmHg in the presence of group IIA element catalysts and group IVA element catalysts or alkoxyantimony compounds or organic acid salts of antimony.

* * * * *